US008516029B1

(12) United States Patent
Koutis et al.

(10) Patent No.: US 8,516,029 B1
(45) Date of Patent: Aug. 20, 2013

(54) METHODS AND APPARATUSES FOR SOLVING GRAPH LAPLACIANS

(75) Inventors: Ioannis Koutis, Pittsburgh, PA (US); Gary Lee Miller, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1104 days.

(21) Appl. No.: 12/483,750

(22) Filed: Jun. 12, 2009

Related U.S. Application Data

(60) Provisional application No. 61/131,814, filed on Jun. 12, 2008.

(51) Int. Cl.
*G06F 7/38* (2006.01)

(52) U.S. Cl.
USPC .......................................................... 708/446

(58) Field of Classification Search
USPC ........................................ 708/446, 520, 607
See application file for complete search history.

(56) References Cited

U.S. PATENT DOCUMENTS

| | | | |
|---|---|---|---|
| 6,078,938 A | 6/2000 | Pan et al. | |
| 7,065,545 B2 | 6/2006 | Quintero-de-la-Garza | |
| 7,089,275 B2 | 8/2006 | Garg | |
| 7,974,977 B2 * | 7/2011 | Liu et al. ........................ | 707/737 |
| 2007/0047810 A1 | 3/2007 | Grady | |
| 2008/0209366 A1 * | 8/2008 | Che et al. ........................... | 716/4 |
| 2008/0309664 A1 * | 12/2008 | Zhou et al. ..................... | 345/420 |
| 2009/0292755 A1 * | 11/2009 | Waagen et al. ............... | 708/520 |

OTHER PUBLICATIONS

Doyle, Peter G. et al., Randon Walks and Electrical Networks, Mathematical Association of America, 1984, TOC.
Briggs, William L. et al., A Multigrid Tutorial, 2nd edition, Society for Industrial and Applied Mathematics, 2000, TOC.
Chung, F.R.K., Spectral Graph Theory, Regional Conference Series in Mathetmatics, vol. 92, American Mathematical Society, 1997, TOC.
Grady, Leo, Random Walks for Image Segmentation, IEEE Trans. on Pattern Analysis and Machine Intelligence, 2 (11): 1768-1783, 2006.
Tolliver, David et al., Graph Partitioning by Special Rounding: Applications in Image Segmentation and Clustering, Computer Vision and Pattern Recognition, CVPR, vol. 1, p. 1053-1060, New York, NY, 2005, IEEE.
Ng, A. et al., On Special Clustering: Analysis and an Algorithm, 2001.
Fouss. Francois, et al.. A Novel Way of Computing Similarities Between Nodes of a Graph, with Application to Collaborative Recommendation, ACM International Conference on Web Intelligence, p. 550-556, 2005.

(Continued)

*Primary Examiner* — Chuong D Ngo
(74) *Attorney, Agent, or Firm* — David G. Oberdick; Peter J. Borghetti

(57) ABSTRACT

Methods and apparatuses for solving a system on a symmetric diagonally dominant matrix. The method includes constructing an equivalent symmetric diagonally dominant linear system Ax=b from the system on a symmetric diagonally dominant matrix, wherein the matrix A of the equivalent linear system Ax=b has negative off-diagonal entries and zero row sums; constructing a graph of the matrix A of the equivalent linear system; constructing a decomposition of the graph; constructing a two-level process using the decomposition of the graph, wherein the two-level process includes reducing the equivalent linear system Ax=b to a linear system By=c; and extending the two-level process to a multi-level process having more than two levels.

35 Claims, 9 Drawing Sheets

(56) References Cited

OTHER PUBLICATIONS

Spielman, Daniel A. et al., Nearly-Linear Time Algorithms for Graph Partitioning, Graph Sparsification, and Solving Linear Systems, Proceedings of the 36th Annual ACM Symposium on Theory of Computing, p. 81-90, Jun. 2004.

Elkin, Michael et al., Lower-Stretch Spanning Trees, Proceedings of the 97th Annual ACM Symposium on Theory of Computing, p. 494-503, 2005.

Koutis, I. et al., A Linear Work, o(n. 1/16) Time, Parallel Algorithm for Solving Planar Laplacians, Eighteenth Annual ACM-SIAM Symposium on Discrete Algorithms, p. 1002-1011, Jan. 2007.

Boman, Erik G. et al., Solving Elliptic Finite Element Systems in Near-Linear Time with Support Preconditioners, CoRR, cs.NA/0407022, 2004.

Avron, Haim et al., Combinatorial Preconditioners for Scalar Elliptic Finite-Elements Problems, under submission, 2006.

Klein, Philip N., on Gazit and Miller's Parallel Algorithm for Planar Separators: Achieving Greater Efficiency through Randon Sampling, SPAA p. 43-49, 1993.

Spielman, Daniel A. et al., Nearly-Linear Time Algorithms for Preconditioning and Solving Symmetric, Diagonally Dominant Linear Systems, CoRR, Jul. 24, 2006.

Trottenberg, Ulrich et al., Multigrid, Academic Press, 1st ed., 2000, TOC.

Koutis, Ioannis et al., Graph Partitioning into Isolated, High Conductance Clusters: Theory, Computation and Applications to Preconditioning, Symposium on Parallel Algorithms and Architectures (SPAA), 2008.

Koutis, Ioannis, Combinatorial and Algebraic Tools for Multigrid Algorithms, PhD thesis, CMU, May 2007, CMU CS Tech Report CMU-CS-07-131.

Gremban, Keith, Combinatorial Preconditioners for Sparse, Symmetric, Diagonally Dominant Linear Systems, PhD thesis, CMU, Oct. 1996, CMU CS Tech Report CMU-CD-96-123.

Maggs, Bruce M. et al., Finding Effective Support-Tree Preconditioners, Proceedings of the 17th Annual ACM Symposium on Parallel Algoritms, p. 176-185, Las Vegas, Jul. 2005.

Racke, Harald, Minimizing Congestion in General Networks, Proceedings of the 43rd Symposium on Foundations of ComputerScience, p. 43-52, IEEE, 2002.

Bienkowski, Marcin et al., A Practical Algorithm for Constructing Oblivious Routing Schemes, Proceedings of the Fifteenth Annual ACM Symposium on Parallel Algorithms, p. 24-33, 2003.

Miller, Gary L. et al., Lower Bounds for Graph Embeddings and Combinatorial Preconditioners, Proceedings of the Sixteenth Annual ACM Symposium on Parallel Algorithms, p. 112-119, 2004.

Plotkin, Serge et al., Shallow Excluded Minors and Improved Graph Decompositions, 1994, SODA: ACM-SIAM Symposium on Discrete Algorithsm, A Conference on Theoretical and Experimental Analysis of Discrete Algorithms, p. 462-470.

Frederickson, Greg N., Fast Algorithms for Shortest Paths in Planar Graphs, with Applications, SIAM J. Comput., 16(6): 1004-1022, 1987.

Golub, G.H. et al., Matrix Computations, The John Hopkins University Press, Baltimore, 3rd ed., 1996, TOC.

Demmel, James W., Applied Numerical Linear Algebra, SIAM, 1997, TOC.

Hoperoft, John E., et al., Efficient Planarity Testing, J. ACM 21(4): 549-568, 1974.

Ramachandran, Vijaya et al., Planarity Testing in Parallel, J. Comput. Syst. Sci. 49(3): 517-561, 1994.

Klein, Philip N. et al., An Efficient Parallel Algorithm for Planarity, J. Comput. Syst. Sci., 37(2): 190-246, 1988.

Kiwi, Marcos A. et al., Min-Max Boundary Domain Decomposition, Theor. Comput. Sci. 261(2): 253-266, 2001.

Goodrich, Michael T., Planar Separators and Parallel Polygon Triangulation, J. Comput. Syst. Sci., 51(3): 374-389, 1995.

Luby, Michael, A Simple Parallel Algorithm for the Maximal Independent Set Problem, SIAM J. Comput. 15(4): 1036-1053, 1986.

Reid-Miller, Margaret et al., List Ranking and Parallel Tree Con-Traction, John Reif ed., Synthesis of Parallel Algorithms, p. 115-194, Morgan Kaufmann, 1993.

Spielman, Daniel A., et al., Solving Sparse, Symmetric, Diagonally-Dominant Linear Systems in Time 0(nar.31), FOGSs '03: Proceedings of the 44th Annual IEEE Symposium on Foundations of Computer Science, p. 416, IEEE Computer Society, 2003.

Pan, Victor Y. et al., Fast and Efficient Parallel Solution of Sparse Linear Systems, SIAM J. Comput. 22(6): 1227-1250, 1993.

\* cited by examiner

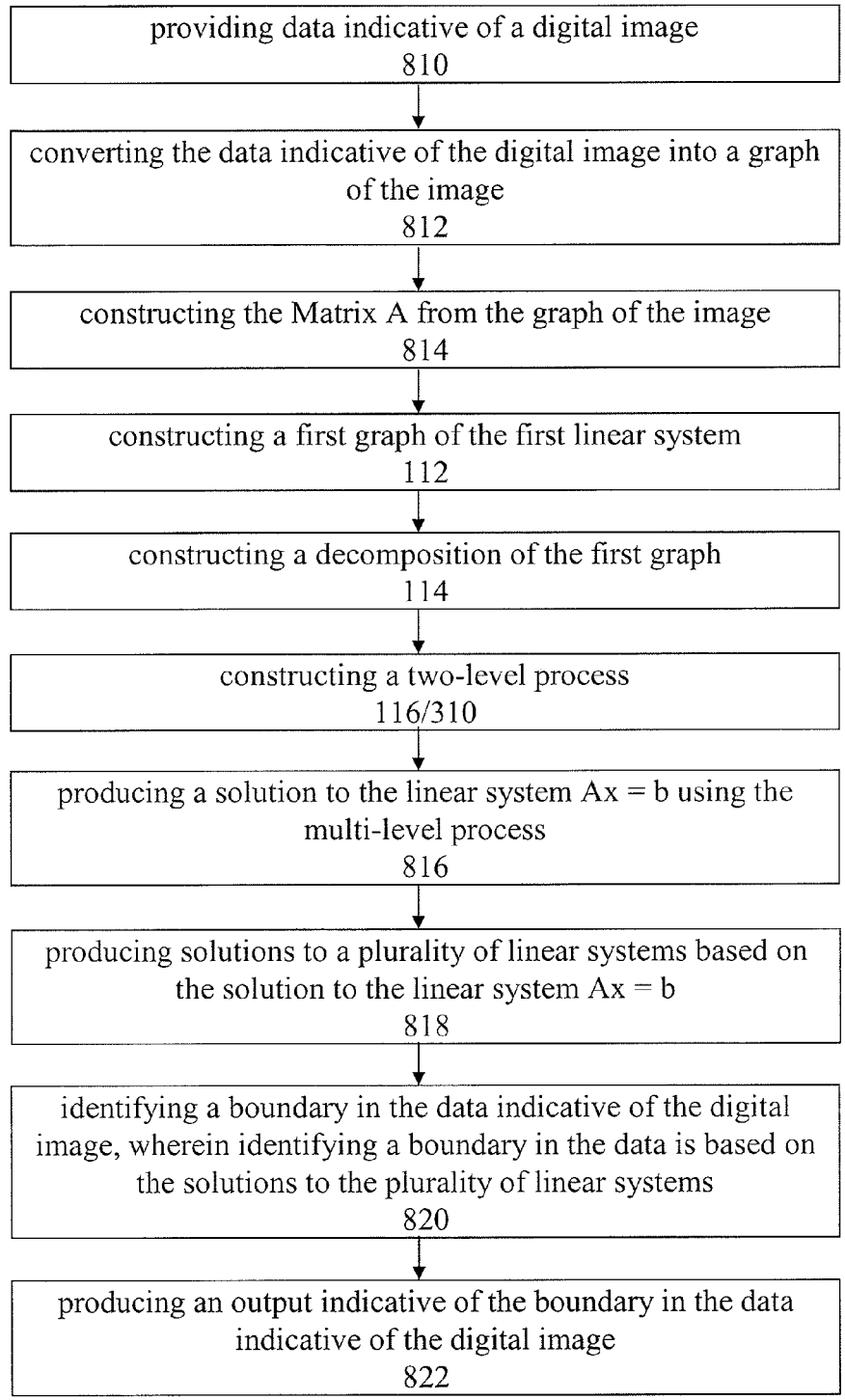

METHODS AND APPARATUSES FOR SOLVING GRAPH LAPLACIANS

CROSS-REFERENCE TO RELATED APPLICATIONS

This application claims priority from U.S. provisional patent application No. 61/131,814, filed Jun. 12, 2008, which is incorporated herein by reference. This application is related to U.S. patent application Ser. No. 11/998,382, filed Nov. 29, 2007.

STATEMENT REGARDING FEDERALLY-SPONSORED RESEARCH AND DEVELOPMENT

This invention was made, in part with government support under Grant Number CCF-0635257 awarded by the National Science Foundation. The United States government may have certain rights in this invention.

FIELD OF THE INVENTION

The present invention relates to methods and apparatuses for solving graph Laplacians and, for example, for computational methods to solve systems of linear equations.

BACKGROUND OF THE INVENTION

Basic Terminology

A matrix A is called a Laplacian, if the following three conditions hold: (i) $A_{i,j}=A_{j,i(ii)}A_{i,j}\leq 0$ for all $i \neq j$, and $A_{i,i}=\Sigma_{i \neq j}|A_{i,j}|$. Laplacians are a subclass of the class of symmetric diagonally dominant (SDD) matrices.

Let $G=(V, E, w)$ be a weighted graph, where $V=\{v_1, \ldots, v_n\}$ is the set of vertices, $E=V \times V$ is the set of edges and w is a weight function on E. G is the graph of the Laplacian A if and only if $w(v_i, v_j)=-A_{i,j}$. If $G_1=(V, E, w_1)$, $G_2=(V, E, w_2)$ and $G=(V, E, w_1+w_2)$, we have $A_G=A_{G_1}+A_{G_2}$. Because of this one-to-one correspondence we will often use interchangeably the terms Laplacian and graph.

Multilevel Linear System Solvers

Direct methods, such as Cholesky decomposition, solve a linear system Ax=b exactly. Their memory requirements are typically prohibitive for very large systems that occur in many commercial and academic applications.

As an alternative to direct methods, iterative methods start with an initial approximation $x_0$ to the linear system Ax=b. Through repeated iterations, they produce a sequence of approximations $x_1, \ldots, x_t$, which converges to the system solution. Two-level methods include methods that produce the approximation $x_t$ as a function $x_t=g(B^{-1}c, A, b)$ where B is a smaller linear system, and c is obtained as a function $c=f(A, x_{t-1}, \ldots, x_1, b)$. The vector $B^{-1}c$ is computed through solving the linear system By=c via a direct method. Although the present invention will generally be described in terms of each iteration resulting in a smaller linear system, this is not always required with the present invention. For example, a subsequent linear system may be larger than its predecessor in order to facilitate an overall reduction in size of the linear systems as the iterations proceed.

Typically the linear system By=c is too large for the requirements of a direct method. In this case, one can substitute into the above function g the $t_1^{th}$ iterate of a two-level method for the system By=c, where the number of recursive calls $t_1$ is a properly picked constant. This defines a three-level method. The reduction into progressively smaller linear systems can be continued until the linear system reaches a predetermined size where it can be solved through a direct method.

Hence, in order to construct a multi-level method it is enough to construct a sequence of two-level methods, and define the numbers t of recursive calls between the levels. Henceforth, we restrict our attention to the construction of two-level methods.

Transformation of SDD Linear Systems to Laplacian Linear Systems

Let A be a symmetric diagonally dominant matrix, i.e. for all i, $A_{i,i} \geq \Sigma_{j \neq i}|A_{i,k}|$. We can write A as $A=D+A_p+A_n$, where D is the diagonal of A and $A_p$ is the matrix consisting of the positive off-diagonal entries of A. We observe that the matrix $$B = \begin{pmatrix} D+A_n & -A_p \\ -A_p & D+A_n \end{pmatrix}$$

is SDD and it has only non-positive off-diagonal entries. In addition, in order to solve the system Ax=b it is enough to solve the system $$B\begin{pmatrix} x \\ -x \end{pmatrix} = \begin{pmatrix} b \\ -b \end{pmatrix}$$

Hence, in order to construct a solver for SDD linear systems, it is enough to construct a solver for SDD linear systems with non-positive off-diagonals.

Now let g be vector with $g_i=B_{i,i}+\Sigma_{j \neq i}B_{i,j}$. We observe that the matrix $$C = \begin{pmatrix} B & 0 & -g \\ 0 & B & -g \\ -g^T & -g^T & \sum_i g_i \end{pmatrix}$$

is a Laplacian. In addition, in order to solve the system Bx'=b', it is enough to solve the system $$C\begin{pmatrix} x' \\ -x' \\ 0 \end{pmatrix} = \begin{pmatrix} b' \\ -b' \\ 0 \end{pmatrix}$$

Hence, in order to construct a solver for SDD linear systems, it is enough to construct a solver for Laplacians.

Henceforth, we restrict our attention to a method for Laplacian linear systems. A Laplacian solver can be augmented to an SDD solver through operations that carry out the above transformations. Due to the special structure of the transformed linear systems, one embodiment of the SDD solver does not store in the memory, the non-zero elements of B and C that are in excess of the non-zero elements of A.

DISCUSSION OF THE RELATED ART

Laplacians of combinatorial graphs arise in the discretization of the inhomogeneous Laplace (Poisson) equation. They are also intimately connected to electrical networks [Peter G.

Doyle and J. Laurie Snell. *Random Walks and Electrical Networks*. Mathematical Association of America, 1984.]. Solving Laplacians in the context of these two classical scientific computing applications was important enough to motivate and sustain for decades the research on multigrid methods [William L. Briggs, Van Emden Henson, and Steve F. McCormick. *A multigrid tutorial: second edition*. Society for Industrial and Applied Mathematics, 2000.]. Given the direct relationship of Laplacians with random walks on graphs [F. R. K. Chung. *Spectral Croph Theory*, volume 92 of *Regional Conference Series in Mathematics*. American Mathematical Society, 1997.], linear systems involving Laplacians quickly found other applications in Computer Science. Laplacian solvers are now used in applications that include segmentation of medical images [Leo Grady. Random walks for image segmentation. *IEEE Trans. on Pattern Analysis and Machine 295 Intelligence*, 2(11):1768-1783, 2006;. David Tolliver and Gary L. Miller. Graph partitioning by spectral rounding: Applications in image segmentation and clustering. In *Computer Vision and Pattern Recognition, CVPR*, volume 1, pages 1053-1060, New York, N.Y., 2006. IEEE.], collaborative filtering and more general clustering problems [A. Ng, M. Jordan, and Y. Weiss. On spectral clustering: Analysis and an algorithm, 2001.; Francois Fouss, Alain Pirotte, and Marco Saerens. A novel way of computing similarities between nodes of a graph, with application to collaborative recommendation. In *ACM International Conference on Web Intelligence*, pages 550-556, 2005.]. The recent theoretical progress that showed that graph Laplacians can be solved in nearly linear time [Daniel A. Spielman and Shang-Hua Teng. Nearly-linear time algorithms for graph partitioning, graph sparsification, and solving linear systems. In *Proceedings of the 36th Annual ACM Symposium on Theory of Computing*, pages 81-90, June 2004.; Michael Elkin. Yuval Emek, Daniel A. Spielman, and Shang-Hua Teng. Lower-stretch spanning trees. In *Proceedings of the 97th Annual ACM Symposium on Theory of Computing*, pages 494-503, 2005.], or strictly linear time for planar graphs [Ioannis Koutis and Gary L. Miller. A linear work, $o(n^{1/6})$ time, parallel algorithm for solving planar laplacians. In *Eighteenth Annual ACM-SIAM Symposium on Discrete Algorithms*, pages 1002-1011, January 2007.] has generated research activity that successfully expanded the applicability of Laplacian linear system solvers to systems that arise when applying the finite element method to solve elliptic partial differential equations [Erik G. Boman, Bruce Hendrickson, and Stephen A. Vavasis. Solving elliptic finite element systems in near-linear time with support preconditioners. *CoRR*, cs.NA/0407022, 2004.: Haim Avron, Doron Chen, Gil Shklarski, and Sivan Toledo. Combinatorial preconditioners for scalar elliptic finite-elements problems. under submission, 2006.] and to general positive definite matrices with negative off-diagonal elements with so application in classic combinatorial problems [Daniel A. Spielman and Samuel I. Daitch. Faster approximate lossy generalized flow via interior point algorithms. In *Proceedings of the 40th Annual ACM Symposium on Theory of Computing*, May 2008.]. Several of these applications generate graphs with several million vertices. Very often, the graphs are planar, as in the case of two dimensional elliptic partial differential equations. In several cases they additionally have a very simple structure. For example, the graphs in medical image segmentation are two and three dimensional weighted lattices, with optional extra high degree nodes connecting some of the lattice nodes [D. A. Tolliver, I. Koutis, H. Ishikawa, J. S. Schuman, and G. L. Miller. Automatic multiple retinal layer segmentation in spectral domain OCT scans via spectral rounding. In *ARVO Annual Meeting*, May 2008.].

The very large size of the graphs prohibits their solution via direct methods, e.g. Cholesky factorization. This leads to the idea of "two-level" processes that attempt to reduce the solution of the given system on a graph $A_0$ to a number of linear systems on a smaller graph $A_l$ followed by prolongation and correction on $A_0$. The two-level process approach can then be applied recursively to the system $A_1$, to produce a hierarchy of graphs $A_0, A_1, \ldots, A_d$ such that the last graph $A_d$ is sufficiently small for a direct method. Two metrics characterize a two-level method; the reduction factor, i.e. the ratio of the sizes of the two graphs, and the convergence rate which is captured by the number of linear systems on $A_1$ that must be solved in order to compute the solution for $A_0$. The quality of the two-level method is determined by the ratio of the reduction factor over the rate of convergence. Of course, to serve its purpose, the two-level method should itself have an efficient construction.

Despite their groundbreaking nature, the algorithms of Spielman and Teng [Daniel A. Spielman and Shang-Hua Teng. Nearly-linear time algorithms for graph partitioning, graph sparsification, and solving linear systems. In *Proceedings of the 36th Annual ACM Symposium on Theory of Computing*, pages 81-90, June 2004.; Daniel A. Spielman and Shang-Hua Teng. Nearly-linear time algorithms for preconditioning and solving symmetric, diagonally dominant linear systems, 2006.] have a somewhat limited practicality because their asymptotic running time hides polylogarithmic terms and large constants. In addition, they are not parallelizable.

A previous disclosure of the present inventors described a linear work parallel construction of a two-level process for planar graphs, which simultaneously achieves a fixed reduction factor and convergence rate. The algorithm constructs sparse graph preconditioners based on small vertex separators. While the idea of using vertex separators is naturally transferable to three dimensional lattices, the relatively larger size of the three dimensional vertex separators severely affects the convergence rate.

Patent Application No: US 2007/0047810 of Leo Grady builds upon extensive prior literature on Algebraic Multigrid algorithms (AMG) [Ulrich Trottenberg, Anton Schuller, and Cornelis Oosterlee. *Multigrid*. Academic Press, 1st edition, 2000.]. The disclosed two-level process can be constructed efficiently, it guarantees a constant reduction factor, and in certain examples it is faster than prior art. However, the method is restricted to lattices and doesn't allow more complex geometries such as high degree nodes or long range connections. More importantly, the selection of the two-level operators is heuristic and the disclosed method does not provide guarantees on the convergence rate. In fact, in light of the theory developed in [Ioannis Koutis and Gary L. Miller. Graph partitioning into isolated, high conductance clusters: Theory, computation and applications to preconditioning. In *Symposiun on Parallel Algorithms and Architectures (SPAA)*, 2008.; Ioannis Koutis. *Combinatorial and algebraic tools for multigrid algorithms*. PhD thesis, Carnegie Mellon 300 University, Pittsburgh, May 2007. CMU CS Tech Report CMU-05-07-131.], the lattice preservation policy of the method can lead to arbitrarily had convergence rates.

Accordingly, there is a need for improved methods which would enable the efficient construction of two-level processes that simultaneously provide a constant reduction factor and a fast rate of convergence for constant average degree graphs.

BRIEF SUMMARY OF THE INVENTION

The present invention relates to methods and apparatuses for solving graph Laplacians. The present invention includes, for example, a computer to solve systems of linear equations, Ax=b where A is a symmetric diagonally dominant matrix. The invention provides a method for decomposing a graph derived from the matrix A in a manner which enables the construction of two-level processes that reduce the number of variables by at least a constant fraction, while satisfying exact bounds on the convergence rate. The convergence rate is a constant independent from the graph size for the very important case of graphs in which the average weighted degree is a fixed constant. The proposed algorithm does O(n) work. In addition, the algorithm is parallel. The availability of additional processors accelerates the algorithm by a factor that scales up with the number of processors.

The present invention provides a method for the construction of various two-level processes for solving Laplacians of graphs. The processes can be constructed with 0(n) work, in O(log n) parallel time and they achieve at least a fixed reduction factor in the number of vertices, while providing exact and testable bounds on the convergence rate. The convergence rate is guaranteed to be a constant independent from the graph size, for all graphs whose average weighted degree is a constant.

The method of the present invention extends prior work on Steiner graph preconditioners [Keith Gremban. *Combinatorial Preconditioners for Sparse, Symmetric, Diagonally Dominant Linear Systems*. PhD thesis, Carnegie Mellon University, Pittsburgh, October 1996. CMU CS Tech Report CMU-CS-96-123;. Bruce M. Maggs, Gary L. Miller, Ojas Parekh, R. Ravi, and Shan Leung Maverick Woo. Finding effective support-tree preconditioners. In *Proceedings of the 17th Annual ACM Symposium on Parallel Algorithms*, pages 176-185, 2005.; Ioannis Koutis and Gary L. Miller. Graph partitioning into isolated, high conductance clusters: Theory, computation and applications to preconditioning. In *Symposiun on Parallel Algorithms and Architectures (SPAA)*, 2008.] which, in contrast to the subgraph preconditioners such as those disclosed in [Ioannis Koutis and Gary L. Miller. A linear work, $o(n^{1/6})$ time, parallel algorithm for solving planar laplacians. In *Eighteenth Annual ACM-SIAM Symposium on Discrete Algorithms*, pages 1002-1011, January 2007.; Daniel A. Spielman and Shang-Hua Teng. Nearly-linear time algorithms for graph partitioning, graph sparsification, and solving linear systems. In *Proceedings of the 36th Annual ACM Symposium on Theory of Computing*, pages 81-90, June 2004.], introduce "supernodes" known as Steiner nodes. The method is based on the theoretical realization that, in order to construct a good Steiner preconditioner it is enough to compute a partitioning of the graph nodes into disjoint clusters, possessing the expansion property. The expansion property requires that the graph induced by each cluster along with the edges leaving the cluster, is well connected. In contrast to the special edge-disjoint clusterings of [Ioannis Koutis and Gary L. Miller. A linear work, $o(n^{1/6})$ time, parallel algorithm for solving planar Laplacians. In *Eighteenth Annual ACM-SIAM Symposium on Discrete Algorithms*, pages 1002-1011, January 2007.] which exist only in certain classes of graphs, all graphs have good vertex-disjoint clusterings [Harald Räcke. Minimizing congestion in general networks. In *Proceedings of the 43rd Symposium on Foundations of Computer Science*, pages 43-52. IEEE, 2002.; Marcin Bienkowski, Miroslacv Korzeniowski, and Harald ROcke. A practical algorithm for constructing oblivious routing schemes. In *Proceedings of the Fifteenth Annual ACM Symposium on Parallel Algorithms*, pages 24-33, 2003.]. When the graph has fixed average degree the required edge separator can be computed efficiently by the method of the present invention. In general, a higher average degree usually implies a degradation in the quality of the preconditioner produced by our method. However, for many practical cases that include lattices, the higher average degree of the graph allows decompositions with a stronger expansion property. The proposed method is properly tuned so that it finds clusters with better connectivity whenever possible. This in practice leads to better rates of convergence for higher dimensional lattices as predicted by prior theoretical results [Gary L. Miller and Peter C. Richter. Lower bounds for graph embeddings and combinatorial preconditioners. In *Proceedings of the sixteenth Annual ACM Symposium on Parallel Algorithms*, pages 112-119, 2004.; Bruce M. Maggs, Gary L. Miller, Ojas Parekh, R. Ravi, and Shan Leung Maverick Woo. Finding effective support-tree preconditioners. In *Proceedings of the 17th Annual ACM Symposium on Parallel Algorithms*, pages 176-185, 2005.].

The Steiner preconditioner can be used explicitly in any preconditioned iterative method such as the Richardson iteration, the Conjugate Gradient iteration or the Chebyshev iteration, according to the methodology disclosed in [Keith Gremban. *Combinatorial Preconditioners for Sparse, Symmetric, Diagonally Dominant Linear Systems*. PhD thesis, Carnegie Mellon University, Pittsburgh, October 1996. CMU CS Tech Report CMU-CS-96-123.]. Alternatively, it can be used implicitly in a classical two-level process (e.g. see [Ulrich Trottenberg, Anton Schuller, and Cornelis Oosterlee. Multigrid. Academic Press, 1st edition, 2000.]) based on the definition of a relaxation operator, restriction and prolongator operators. The operators are carefully chosen to correspond to the Gaussian elimination of the leaf nodes of the Steiner preconditioner [Ioannis Koutis. *Combinatorial and algebraic tools for multigrid algorithms*. PhD thesis, Carnegie Mellon 300 University, Pittsburgh, May 2007. CMU CS Tech Report CMU-CS-07-131.]. It can be shown that the quality of the preconditioner also characterizes the convergence rate of the two-level multigrid process. Both the explicit and the implicit two-level methods can naturally be extended to full multilevel methods by their recursive application in a manner known to those skilled in the art. A multigrid cycle defines a symmetric operator which can be used in combination with the Conjugate Gradient iteration for further acceleration of the convergence rate.

The objects of the present invention are achieved in general by providing computer methods for the construction of two-level methods for Laplacians. The method comprises three main steps, namely (1) decomposition of the graph; (2) construction of the Steiner preconditioner for the given graph or for a proper modification of it; (3) construction of the explicit or the implicit two-level process.

The first step, decomposition of the graph, comprises the (1) optional perturbation of each graph edge by a small random multiplicative factor; (2) computation of a forest of trees in the graph, by performing a local operation in which each node connects to the rest of the tree by its preferred edge, defined as the incident edge with the largest weight; (3) removal of the preferred edge for sonic high degree nodes; (4) so further decomposition of the largest trees in the forest.

The second step, construction of the Steiner preconditioner, comprises the (1) construction of a rooted weighted star for each cluster in the decomposition constructed through the first step. with its leaves corresponding to the nodes of the cluster; (2) connection of the star roots by properly weighted edges. This forms the preconditioner. In a different embodiment of the invention the second step constructs a different pair of a graph and a preconditioner. In this case, the second step comprises the (1) proper subdivision of each edge leaving a cluster of the original graph; (2) extension of the original disjoint clusters to overlapping clusters by the assignment of each newly introduced vertex to its two incident clusters: (3) construction of a rooted weighted star for each cluster in the decomposition. This forms the preconditioner.

In the third step a methodology is provided for the use of the Steiner preconditioner in tandem with various preconditioned iterative methods. Alternatively the Steiner preconditioner is used implicitly for the construction of a two-level multigrid method, through the precise definition of (1) the relaxation operator; (2) the restriction and prolongator operators; (3) the second level graph, also known as the coarse grid in multigrid terminology.

The present invention includes both methods and apparatuses. The present invention includes and can be embodied as, for example, computer-readable instructions such as software, firmware, hardware, and other embodiments which, when executed by a processor, causes the processor to perform certain actions according to the present invention.

In one embodiment, the present invention includes an apparatus including a processor, memory, an input device, and an output device. The memory includes computer-readable instructions which, when executed, cause the processor to perform the methods described herein.

Many variations are possible with the present invention, and those and other teachings, variations, and advantages of the present invention will become apparent from the description and figures of the invention.

BRIEF DESCRIPTION OF THE SEVERAL VIEWS OF THE DRAWING

Embodiments of the present invention will now be described, by way of example only, with reference to the accompanying drawings for the purpose of illustrating the embodiments, and not for purposes of limiting the invention, wherein:

FIG. 8 illustrates a flow diagrams according to one embodiment of the present invention.

DETAILED DESCRIPTION OF THE INVENTION

The present invention will generally be described in terms of a method, although the present invention includes other embodiments as well such as, but not limited to, computer readable instructions embodied, for example, as software, firmware, and hardware. The present invention may also take other forms.

Figure 1:
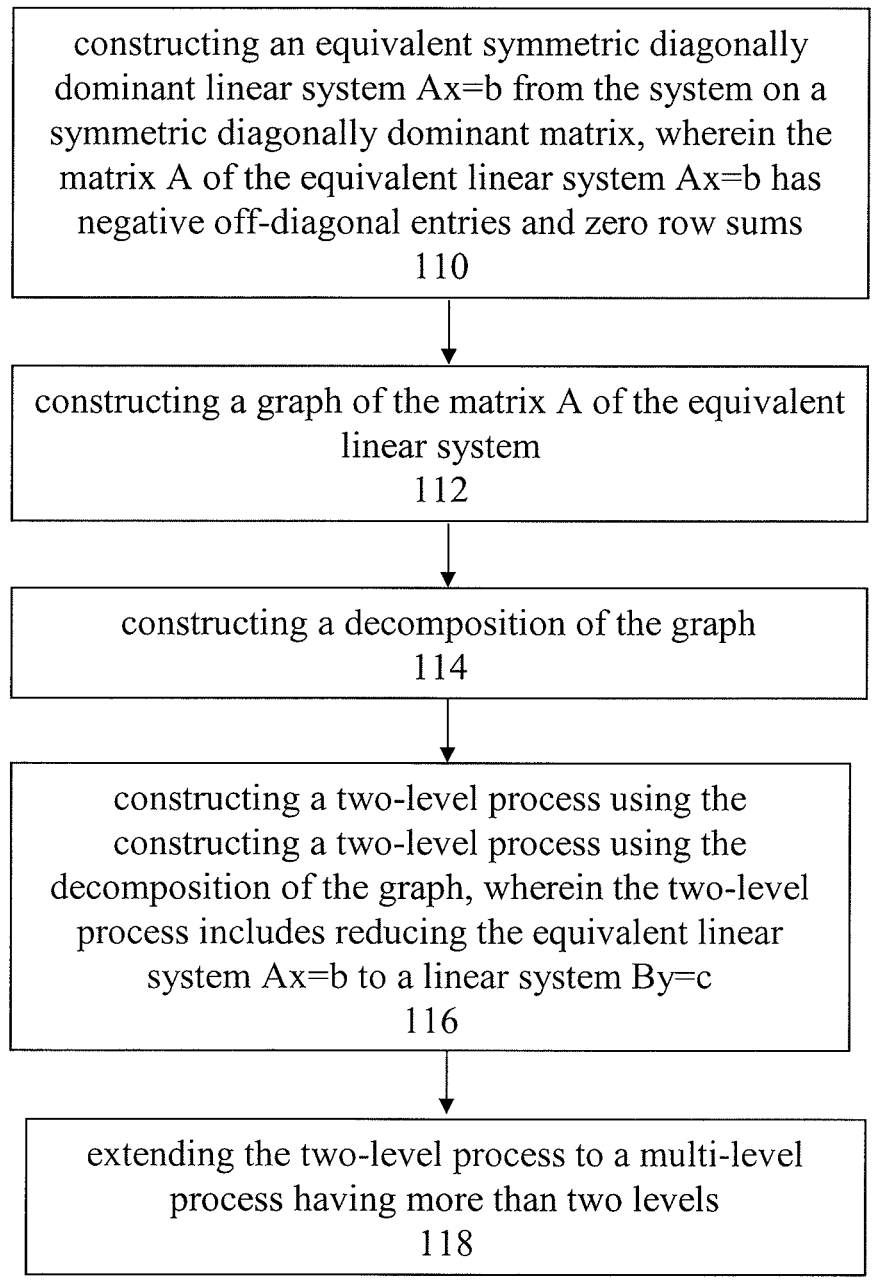
FIGS. 1-5 illustrate flow diagrams according to embodiments of the present invention.

FIG. 1 is a flow diagram illustrating one embodiment of the present invention. That embodiment illustrates a method that may be used, for example, for solving a system on a symmetric diagonally dominant matrix.

Step 110 includes constructing an equivalent symmetric diagonally dominant linear system Ax=b from the system on a symmetric diagonally dominant matrix, wherein the matrix A of the equivalent linear system Ax=b has negative off-diagonal entries and zero row sums.

Step 112 includes constructing a graph of the matrix A of the equivalent linear system.

Step 114 includes constructing a decomposition of the graph.

Step 116 includes constructing a two-level process using the decomposition of the graph, wherein the two-level process includes reducing the equivalent linear system Ax=b to a linear system By=c.

Step 118 includes extending the two-level process to a multi-level process having more than two levels.

Many variations are possible with the present invention. For example, step 118 may include constructing a sequence of two-level methods $P_1, P_2, \ldots, P_m$. In the sequence of two-level methods $P_1, P_2, \ldots, P_m$, $P_i$ is a reduction of a linear system $A_i\ x_i=b_i$ to a linear system $B_i\ y_i=c_i$; the linear system $A_{i+1}\ x_{i+1}=b_{i+1}$ is identical to the linear system $B_{i-1}\ y_{i-1}=c_{i-1}$; and the linear system $B_m\ y_m=c_m$ satisfies a predetermined maximum size requirement. The predetermined maximum size requirement may be, for example, a predetermined size that can be solved using a direct solver. The predetermined maximum size may vary depending on the particular application and may depend on many factors, such as resources available to the direct solver, time constraints, and other considerations.

Other variations are also possible with the present invention. For example, the method may also include constructing one or more Steiner preconditioners for the graph using the decomposition, and constructing the two-level process using the Steiner preconditioners for the graph.

In another embodiment, constructing Steiner preconditioners for the graph includes constructing a rooted weighted star for each cluster in the decomposition of the graph, wherein leaves of the rooted weighted star correspond to nodes in the cluster; and connecting roots of the star by properly weighted edges to form the preconditioner.

In another embodiment, constructing a two level process includes constructing an equivalent graph and its linear system through subdividing at least one edge of the graph of the matrix A, and constructing Steiner preconditioners for the equivalent graph using the decomposition.

In another embodiment, constructing the equivalent graph and constructing the Steiner preconditioners for the equivalent graph includes: subdividing the edges whose endpoints are in different clusters of the decomposition; extending original disjoint clusters to overlapping clusters through assigning each newly introduced vertex to its two incident clusters; and constructing a rooted weighted star for each cluster in the decomposition of the graph.

In another embodiment, step 116 may include the use of a Steiner preconditioner with a preconditioned iterative method.

Alternatively, step 116 may include the use of a Steiner preconditioner through the use of a restriction operator, a prolongation operator, a relaxation operator, and a second level graph. Those and other variations and modifications are possible with the present invention.

In another embodiment, constructing the equivalent linear system 110 may include constructing a symmetric diagonally dominant linear system Bx'=b', wherein Bx'=b' is equivalent to Ax=b, and wherein B has non-positive off-diagonal entries; and constructing a symmetric diagonally dominant linear system Cx"=b", wherein Cx"=b" is equivalent to Bx'=b', and wherein C has non-positive off-diagonal entries and zero row sums.

Furthermore, the previous embodiment of constructing the linear system Bx'=b' may include constructing the linear system $$B\begin{pmatrix} x \\ -x \end{pmatrix} = \begin{pmatrix} b \\ -b \end{pmatrix}$$

wherein $$B = \begin{pmatrix} D+A_n & -A_p \\ -A_p & D+A_n \end{pmatrix}.$$

In that embodiment, D is the diagonal of A, $A_p$ is the matrix consisting of the positive off-diagonal entries of A, and $A_n$ is the matrix consisting of the negative off-diagonal entries of A.

Alternatively, the earlier embodiment which constructed the linear system Cx"=b" may include constructing the linear system $$C\begin{pmatrix} x' \\ -x' \\ 0 \end{pmatrix} = \begin{pmatrix} b' \\ -b' \\ 0 \end{pmatrix},$$

wherein $$C = \begin{pmatrix} B & 0 & -g \\ 0 & B & -g \\ -g^T & -g^T & \sum_i g_i \end{pmatrix};$$

and $g_i = B_{i,i} + \Sigma_{j \neq i} B_{i,j}$.

In another embodiment, constructing a decomposition of the graph 114 may include constructing a decomposition of input graph A=(V, E, w), to disjoint clusters $V_i$ with $V = \cup_i V_i$, and wherein a graph induced by vertices in each $V_i$ and edges leaving $V_i$ is a graph of constant conductance.

In another embodiment, constructing the decomposition of the graph 114 may include an Input that is Graph A=(V, E, w), Output that is Disjoint Clusters $V_i$ with $V = \cup_i V_i$, and wherein constructing the decomposition of the graph includes: constructing a graph $\overline{A}$ by independently multiplying each edge in A by a random factor in [1, t] where t≧1 is a constant; letting $W \subseteq V$ be the set of nodes satisfying wd(v)>k·awd(A), for some constant k>4 wherein wd(v) is the weighted degree of node v, and awd(A) is the average weighted degree of the graph A; forming a forest graph F, by keeping the heaviest incident edge of v for each vertex v∈V in $\overline{A}$; removing from F an edge kept by w, for every vertex w∈W; and decomposing each tree T in F into vertex-disjoint trees of constant conductance.

Figure 2:
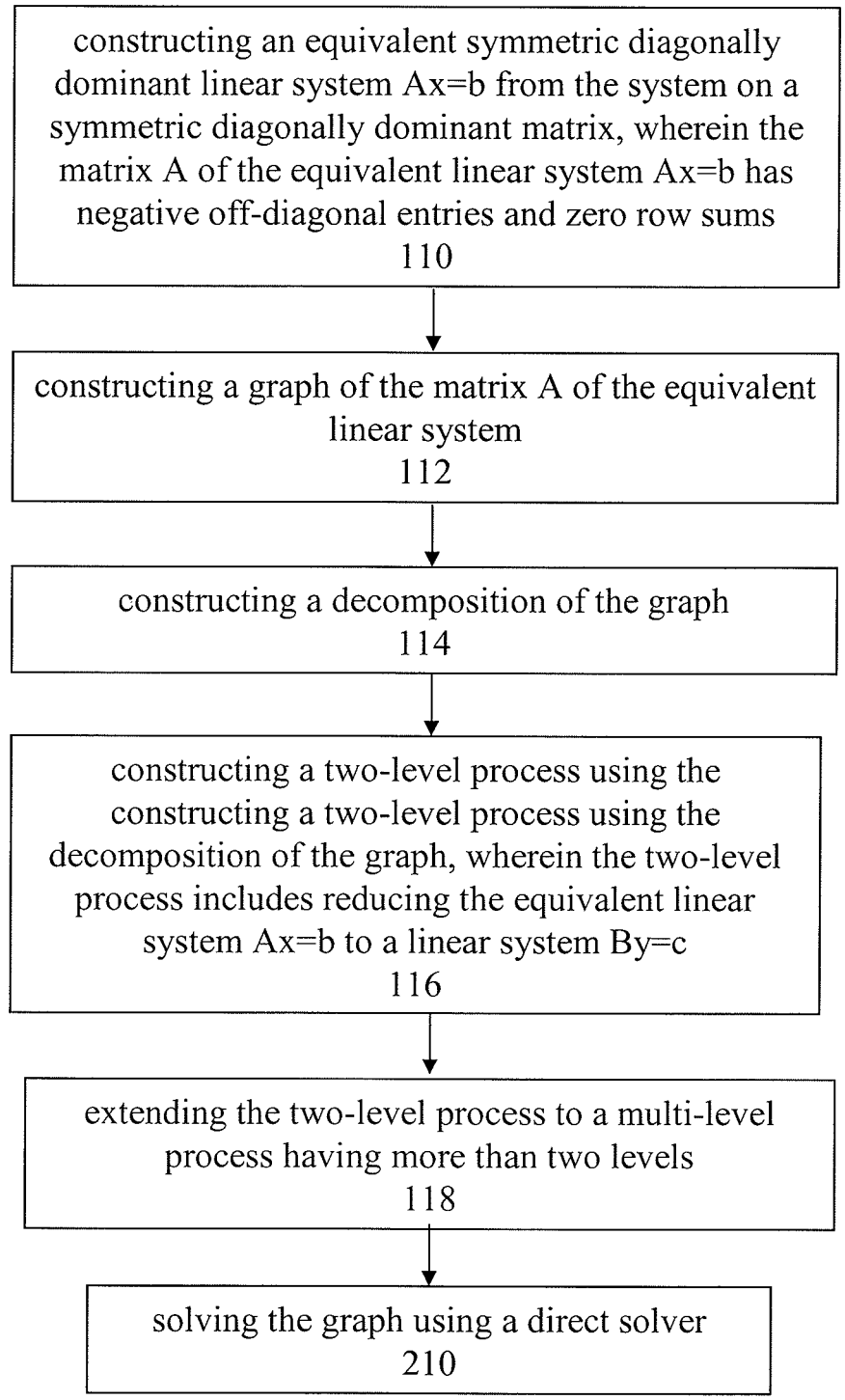

FIG. 2 is a flow chart illustrating another embodiment of the present invention. In that embodiment, the method includes step 210 which includes solving the graph using a direct solver, as discussed above.

Figure 3:
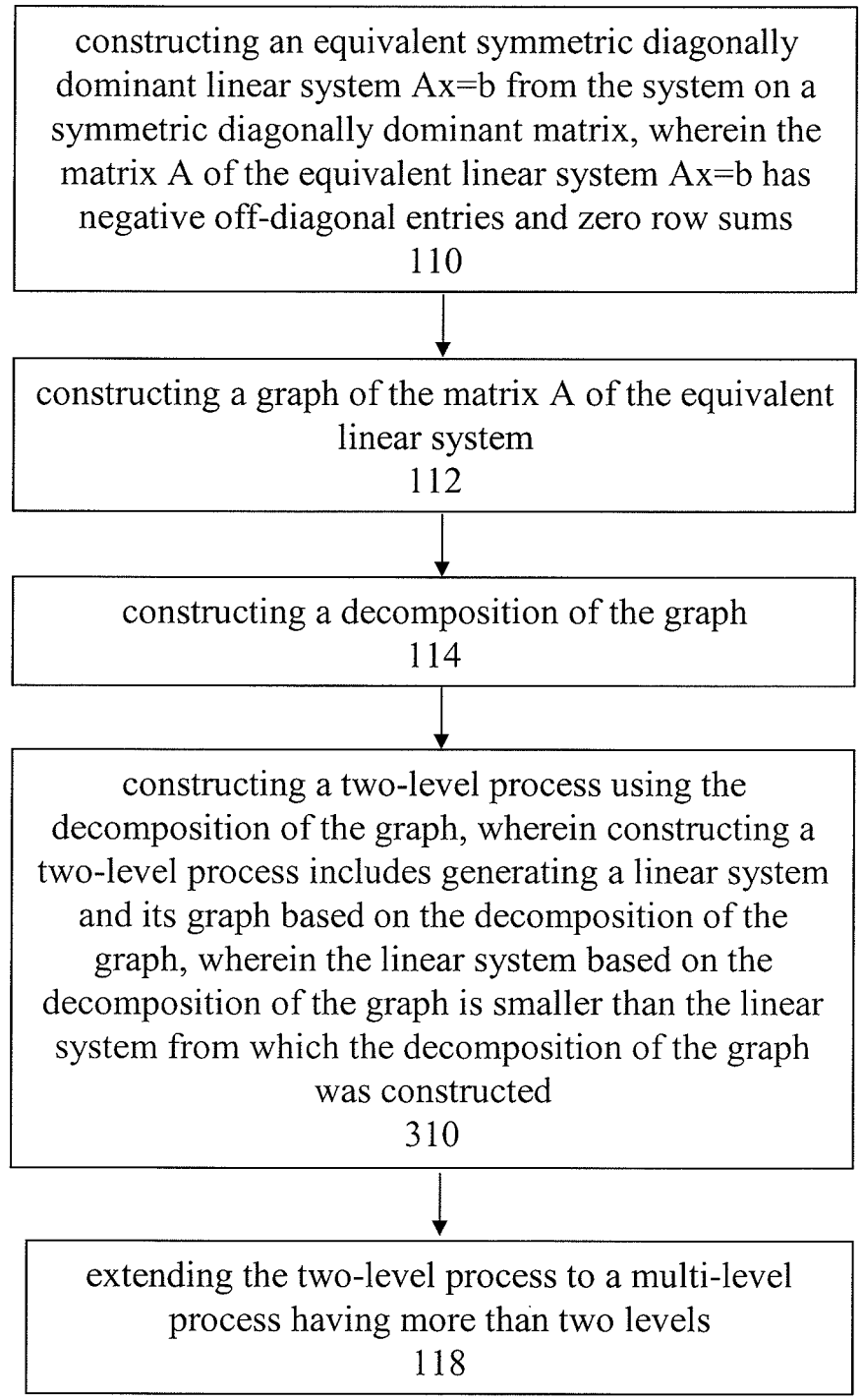

FIG. 3 is a flow diagram illustrating another embodiment of the present invention. Steps 110, 112, 114, and 118 are the same as those discussed above. However, step 310 illustrate an alternative according to the present invention.

Step 310 includes constructing a two-level process using the decomposition of the graph, wherein constructing a two-level process includes generating a linear system and its graph based on the decomposition of the graph, wherein the linear system based on the decomposition of the graph is smaller than the linear system from which the decomposition of the graph was constructed.

Figure 4:
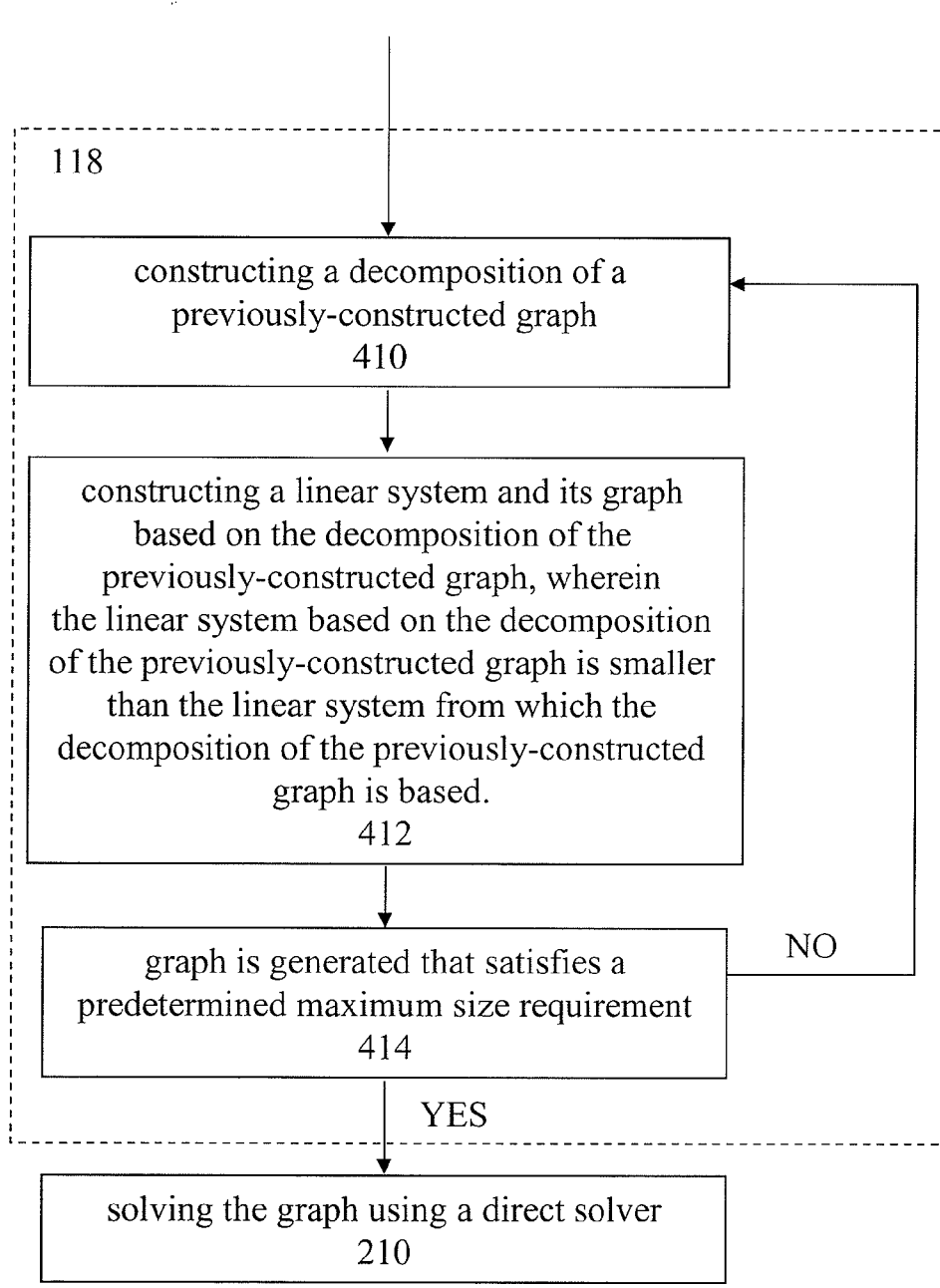

FIG. 4 is a flow diagram illustrating another embodiment of the present invention. In that embodiment, steps 410 and 412 illustrate another implementation of step 118.

Step 410 includes constructing a decomposition of a previously-constructed graph.

Step 412 includes generating a linear system and its graph based on the decomposition of the previously-constructed graph, wherein the linear system based on the decomposition of the previously-constructed graph is smaller than the linear system from which the decomposition of the previously-constructed graph is based.

Steps 410 and 412 have the effect of reducing the size of the graph. In particular, starting with an existing or previously-constructed graph of a particular size, step 410 decomposes that graph or, in other words, constructs a decomposition of the previously-constructed graph. Step 412 works from the decomposition of the previously-constructed graph and generates a "new" linear system and a "new" graph based on the decomposition of the previously-constructed graph. The new linear system created in step 412 is smaller than the previous linear system (i.e., the linear system from which the "new" linear system is based).

Steps 410 and 412 can be performed one time or many times in order to produce a linear system and/or a graph of a desired size. The size of the graph is reduced or decreased with each iteration of the steps 410 and 412. As a result, these steps can be used once or many times to produce a graph of a desired size.

Step 414 includes iterating until a graph is generated that satisfies a predetermined maximum size requirement. Step 414 may be used when, for example, it is desired to execute steps 410 and 412 more than one time.

Step 210 includes solving the graph using a direct solver. The graph which is solved is the graph that satisfies the predetermined maximum size requirement. In other words, when a graph of a desired or predetermined size is obtained, the iteration of steps 410 and 412 may be stopped and the resulting graph of a desired or predetermined size can be solved.

Figure 5:
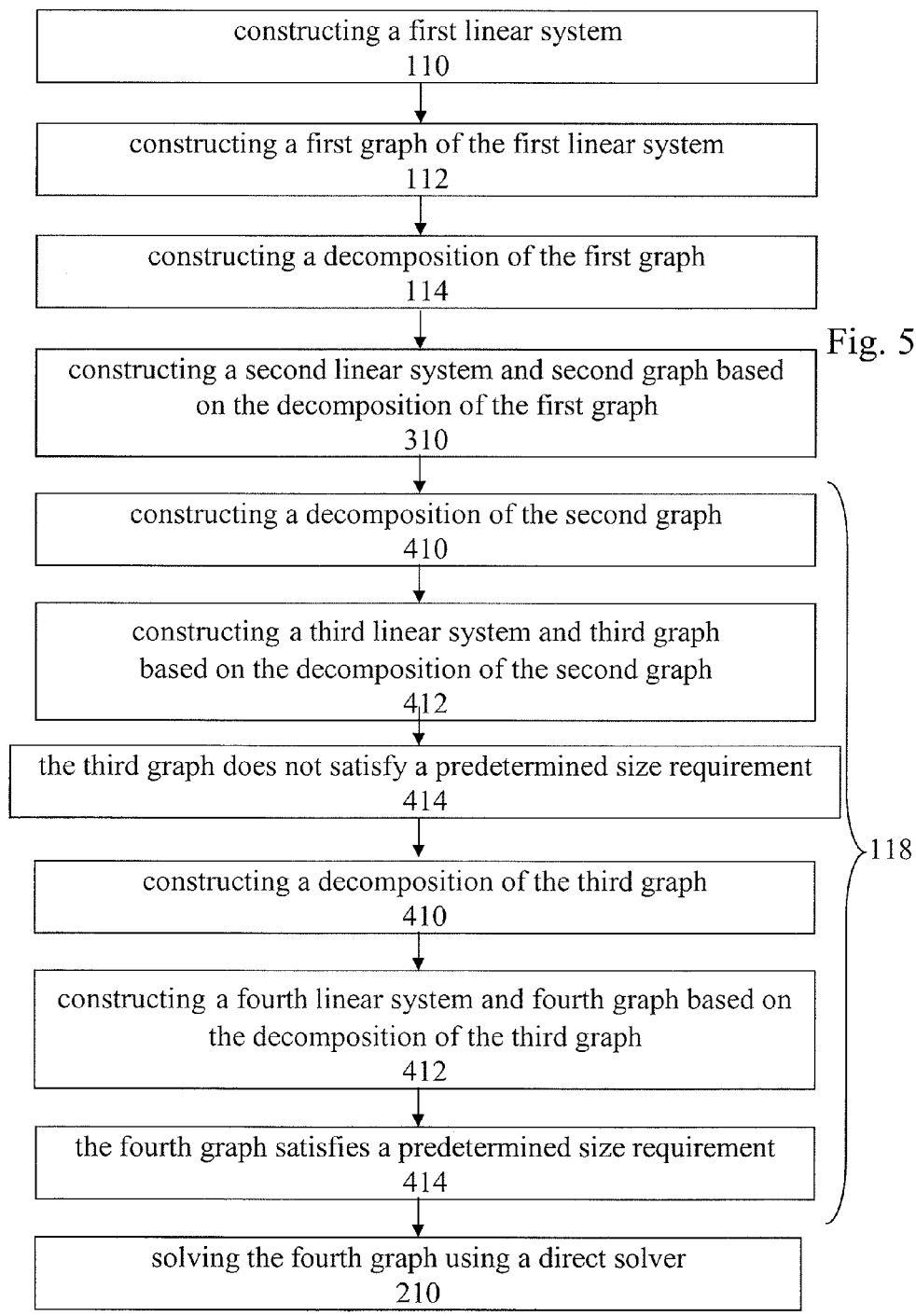

FIG. 5 illustrates one example of the operation of the method according to the present invention. However, terms are used that are specific to this particular example. In particular, steps 110, 112, and 114, reference is made to a "first" linear system, a "first" graph, and a decomposition of the "first" graph. In step 310, reference is made to a "second" linear system and "second" graph based on the decomposition of the "first" graph.

In the first iteration of steps 410 and 412, a decomposition of the second graph is constructed and a third linear system and third graph are constructed based on the decomposition of the second graph.

In the first iteration of step 414, the third graph does not satisfy the predetermined size requirement. Therefore, the method proceeds to step 410.

In the second iteration of steps 410 and 412, a decomposition of the third graph is constructed and a fourth linear system and fourth graph are generated based on the decomposition of the third graph.

In the second iteration of step 414, the fourth graph satisfies a predetermined size requirement and the method proceeds to step 210.

In step 210, the fourth graph is solved using a direct solver.

In this illustrated embodiment, steps 410 and 412 are each performed twice as the method iterates until a graph is constructed that satisfies the predetermined size requirement. However, this figure is illustrative and not limiting, and the method of the present invention may be iterated more than two times or fewer than two times. Furthermore, the use of terms "first", "second", "third" and "fourth" are used to illustrate the present invention and those terms are not limiting of the present invention. In particular, those terms are used to illustrate the present invention and terms used to describe the invention such as "previously-constructed graph" in steps 410 and 412.

Figure 6:
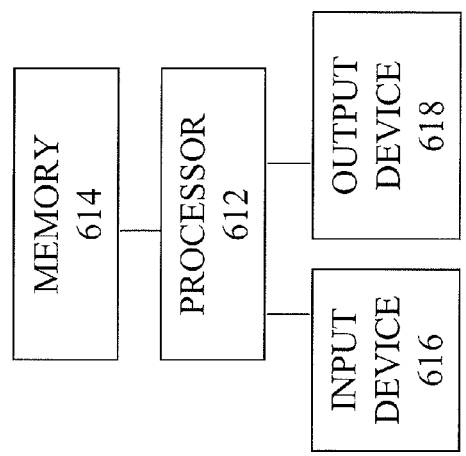
FIGS. 6 and 7 illustrate apparatuses according to embodiments of the present invention.

FIG. 6 illustrates one embodiment of an apparatus according to the present invention. In that embodiment, the apparatus is a computer or other apparatus or system 610 that includes a processor 612, memory 614, an input device 616, and an output or display device 618, such as a monitor. The processor 612 is connected to the memory 614, the input device 616, and the output device 618. The memory 614 includes computer readable instructions, such as computer hardware, software, firmware, or other forms of computer-readable instructions which, when executed by the processor 612, cause the processor 612 to perforin certain functions, as described herein.

The processor 612 receives input from the input device 616, and provides signals to control the output device 618. The processor 612 also performs certain functions, as described herein. For example, the processor 612 may identify data indicative of a system on a symmetric diagonally dominant matrix and then perform the method described above for solving the system. The processor 612 may also perform variations on the methods described herein to produce other results, and many variations are possible. For example, the processor 612 may identify data indicative of a system on a symmetric diagonally dominant matrix by receiving the data from the input device 618, from the memory 614, or from other sources, such by receiving data from another apparatus 610 or via a network.

The memory 614 can be any form of computer-readable memory, and may store information in magnetic form, optical form, or other forms. The memory 614 includes computer readable instructions which, when executed by the processor 612, cause the processor 612 to perform certain functions, as described herein. The memory 614 may be separate from the processor 612, or the memory 614 may be integrated with the processor 612. The memory 614 may also include more than one memory device, which may be integrated with the processor 612, separate from the processor 612, or both.

The input device 616 may be a keyboard, a touchscreen, a computer mouse, a data port, or other forms of inputting information. The input device 616 may also be used for inputting information from a human or from a source other than a human user, such as another computer or memory device.

The output device 618 may be a video display or other forms of outputting information to a user. The output device 618 may also be used for outputting information to something other than a human user, such as a data port.

The present invention has many applications and may be used, for example, in apparatuses and methods used for segmentation of medical imaging, collaborative filtering, and more general clustering problems. Other applications of the present invention include two and three dimensional assisted and unassisted image segmentation, allowing precise and repeatable measurements that enable tasks such as computer aided diagnostics, monitoring of the progress of diseases. Other examples include spectral hashing of images that allows efficient storage and retrieval of related images, Total Variation De-noising of Images, Gradient Inpainting for Images, solution of linear systems that appear in engineering applications such as scalar elliptic partial differential equations discretized through the finite element method. Other examples include recommendation systems for users of database systems, such as movie recommendations. The present invention may also be used in other applications and is not limited to the applications specifically identified herein.

Many variations are possible with the system 610 according to the present invention. For example, more than one processor 612, memory 614, input device 616, and output device 618 may be present in the system 610. In addition, devices not shown in FIG. 6 may also be included in the system 610, and devices shown in FIG. 6 may be combined or integrated together into a single device, or omitted.

In one embodiment, the input device 616 receives data indicative of a digital image. The data is then converted into the system on a symmetric diagonally dominant matrix as discussed above with reference to step 110. The processor 612 may then perform one or more of the methods described above, such as described with regard to FIGS. 1-5, as well as other variations and modifications of those methods. Once completed, the processor 612 may construct a new digital image. The new digital image may be based on, for example, the linear system $B_m \, y_m = c_m$ as described above. The new digital image may be provided to an output device 618 such as a display or monitor for viewing by humans, or it may be provided via a data port of other embodiment of an output device 618, such as for transmission to another processor or device.

The present invention may, for example, be used to perform spectral hashing of images to allow for more efficient storage and retrieval of related images. The present invention may also be used for de-noising of images, gradient inpainting, image segmentation, and other uses. The new image produced by the present invention represents a transformation of the digital image (or data representative thereof) that was received by the input device 616 and is a product of the particular application of the present invention, such as a new image the has been subject to a de-noising process according to the present invention, or a new image that has been segmented, or a new image that has otherwise been transformed to a different state or thing.

Many other variations of the present invention are also possible. For example, the method of the present invention may be performed by the same processor 612 or by different processors 612 or other devices. In one embodiment, data indicative of a digital image or other data may be converted into the system on a symmetric diagonally dominant matrix by the same processor 612 that constructs a graph of the matrix A, constructs a decomposition of the graph, constructs a two level process, and that extends the two-level process. In another embodiment, these steps may be performed by two or more different processors 612 so that, for example, an input device 616 of one of the processors 612 may receive data indicative of the system on a symmetric diagonally dominant matrix without receiving data indicative of the digital image. Regardless of how the process is performed by one or more processors 612, data indicative of the digital image is provided to the processor 612.

Furthermore, although the present invention has been described in terms of processing data indicative of a digital image, the present invention may be used in other applications as described herein.

Figure 7:
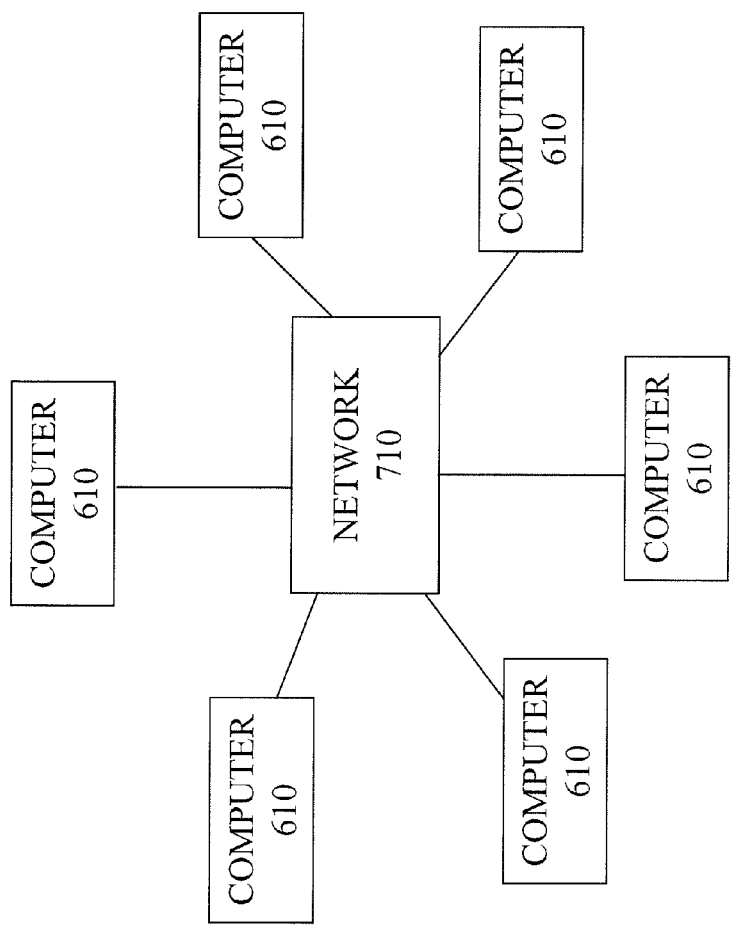

FIG. 7 illustrates another embodiment of the present invention in which several computers 610 are connected together via a network 710. The network, 710 provides a connection between several computers 610. The network 710 may be, for example, the Internet, a local area network, a wide area network, a metro area network, or other networks. The network 710 may be a wired network (such as an electrical network or an optical network), a wireless network, or a combination of different kinds of networks.

As described above, the present invention may be embodied as software, hardware, firmware, or in other forms. The present invention may, for example, be embodied in some or in all of the computers 610 and/or the network 710. For example, one of the computers 610 may include software according to the present invention, and the other computers 610 may not embody the present invention. In other embodiments, several or all of the computers 610 may embody the present invention. In other embodiments, the network 710 may include one or more parts embodying the present invention.

FIG. 8 illustrates a flow diagrams according to one embodiment of the present invention. In that embodiment, the present invention is used for processing digital images.

Steps 810-814 illustrate one embodiment of constructing an equivalent symmetric diagonally dominant linear system 110.

Step 810 includes providing data indicative of a digital image.

Step 812 includes converting the data indicative of the digital image into a graph of the image.

Step 814 includes constructing the Matrix A from the graph of the image.

The steps between 814 and 816 are described in more detail hereinabove.

Steps 816-822 illustrate one embodiment of extending the two-level process 118.

Step 816 includes producing a solution to the linear system Ax=b using the multi-level process.

Step 818 includes producing solutions to a plurality of linear systems based on the solution to the linear system Ax=b.

Step 820 includes identifying a boundary in the data indicative of the digital image, wherein identifying a boundary in the data is based on the solutions to the plurality of linear systems.

Step 822 includes producing an output indicative of the boundary in the data indicative of the digital image.

Many variations and modifications are possible with the present invention.

In one embodiment, identifying a boundary in the data indicative of the digital image includes indentifying a line boundary in data indicative of a two-dimensional image and identifying a surface boundary in data indicative of a three-dimensional image.

In another embodiment, producing output indicative of the boundary in the data indicative of the digital image includes producing a measure of the boundary. For example, the present invention can produce an output indicative a length of a line boundary in a two dimensional image, or a measure of a surface area of a surface boundary in a three dimensional image.

In another embodiment, producing a measure of the boundary includes producing a measure of area of the boundary in data indicative of a two-dimensional image and producing a measure of volume of the boundary in data indicative of a three-dimensional image. For example, the present invention may be used to measure the area within a boundary in a two dimensional image, or a volume within a surface boundary in a three-dimensional image. This may be used, for example to measure the size of a tumor in a medical image or to measure some other feature in a medical or non-medical image.

In another embodiment, producing output indicative of the boundary in the data indicative of the digital image includes producing a new image illustrating the boundary in the data indicative of the digital image. The present invention may be used, for example, to produce a new image based on the image (or image data) provided as input. In the new image, features of the original input may be highlighted or enhanced, or new features may be added, or other transformations or actions may be implemented.

Other variations and modifications are also possible with the methods according to the present invention. For example, the method described in FIG. 8 may be implemented in the apparatuses illustrated in FIGS. 6 and 7, as well as in other apparatuses. The present invention will now be described in more detail.

Basic Notation

Let $G=(V, E, w)$ be a weighted graph, where V is the set of vertices, E is the set of edges and w is a weight function on E. The Laplacian of G is the matrix $A_G$ defined by $A_{ij}=-w_{ij}$ and $A_{ii}=\Sigma_{j\neq i}A_{ij}$. The total incident weight $\Sigma_{u\in N(v)}w(u,v)$ of a vertex v in a graph G is denoted by $vol_G(v)$. We will drop the subscript when the graph is clear from the context. The degree of a vertex is the number of its neighbors in the graph. The weighted degree of a vertex v is defined as the ratio $$wd(v) = \frac{vol(v)}{\max_{u\in N(v)} w(u,v)}.$$

The average weighted of the graph is defined as $$awd(G) = (1/n)\sum_{v\in V} wd(v).$$

For any $V' \subset V$ we let $vol(V')=\Sigma_{v\in V'} vol(v)$, and $out(V')=\Sigma_{v\in V', u\notin V'} w(\overline{u,v})$. We also let $$cap(U, V) = \sum_{u\in U, v\in V} w(u, v)$$

denote the total weight connecting the nodes of the disjoint sets U, V. The sparsity of an edge cut into v' and v−v' is defined as the ratio $$\frac{cap(V, V-V')}{\min(vol(V'), vol(V-V'))}.$$

The conductance of the graph is the minimum sparsity value over all possible cuts.

Let P be a partition of the vertices of a graph $G=(V, E, w)$ into disjoint sets $V_i$, i=1, ..., m and let $G_i$ denote the graph induced by the vertices in $V_i$. The ratio n/m is called the vertex reduction factor. For each $G_i$ in the partition, a vertex is introduced on each edge leaving $G_i$. If $W_i$ is the set of newly introduced vertices for $G_i$, P is called a [$\phi$, $\rho$]-decomposition if for all i the closure graph $G_i^o$ induced by the vertices in $V_i \cup W_i$ has conductance hounded below by $\phi$ and the vertex reduction factor of P is at least p.

Auxiliary Definitions

The support $\sigma(A, B)$ of two Laplacians (A, B) is defined as $\sigma(A,B) = \min\{t \in \mathbb{R} : x^T(\tau B - A)x \geq 0, \text{ for all } x \text{ and all } \tau \geq t\}$.

The condition number is defined as $\kappa(A,B) = \sigma_{max}(A,B)\sigma_{max}(B,A)$.

The set of generalized eigenvalues $\Lambda(A, B)$ $o_f$ a pa$_t$r of Laplacians is defined by $\Lambda(A, B) = \{\lambda: \text{there is real vector } x \text{ such that. } Ax = \lambda Bx\}$.

Let T be a weighted star with n+1 vertices and edge weights $d_1, \ldots, d_n$. The Schur complement S(T, v) of T with respect to its root v, is the graph defined by the weights $S_{ij}(T, v) = d_i d_j / D$ where $D = \Sigma_i d_i$. Let A be any graph, A[V−v] be the graph induced in A by the vertices in V−v, and $T_v$ be the star graph consisting of the edges incident to v in A. The Schur complement S(A, v) of A with respect to vertex v is the graph A[V−v]+S($T_v$,v). Let $W \subset V$ and v be any vertex in W. The Schur complement with S (A, W) is recursively defined as $S(A,W) = S(S(A,v),W−v) = S(S(A,W−v),v)$.

Graph Decomposition

The following algorithm computes a [$\Theta(1/awd(A))$, $\rho$]-decomposition for some p<1.

---

Algorithm 1: Decompose-Graph

Input: Graph A = (V, E, w)
Output: Disjoint Clusters $V_i$ with $V = \cup_i V_i$
1. Independently multiply each edge in A by a random factor in [1, t] where $t \geq 1$ is a small constant.
2. Let $\overline{A}$ be the graph after the perturbation.
3. Let $W \subseteq V$ be the set of nodes satisfying wd(v) > $\kappa \cdot$ awd(A), for some constant $\kappa$ > 4.
4. Form a forest graph F, by keeping the heaviest incident edge of v for each vertex $v \in V$ in $\overline{A}$.
5. For every vertex $w \in W$ such that vol$_T$(w) < (vol$_G$(w)/awd(A)) remove from F the edge kept by w.
6. Decompose each tree T in F into vertex-disjoint trees of constant conductance.

---

Each tree in the forest F is unimodal, meaning that the weights along every path in T can only increase monotonically and then possibly decrease monotonically. This implies that a decomposition of the unweighted version of T into constant conductance clusters is also a decomposition of T into constant conductance clusters. In turn, this enables performing Step 6 of Algorithm 1 in parallel, in a plurality of ways. For example, if the graph G has constant degree it is enough to arbitrarily break T into sub-trees of constant size. In another example, a maximally independent set I of T can be computed, where high degree vertices have priority in joining I over low degree vertices. The vertices that are left out of I can join the cluster of one of their neighbors.

An alternative to Algorithm 1 is as follows. As with Algorithm 1, an Input is Graph A=(V, E, w), and Output is Disjoint Clusters $V_i$ with $V = \cup_i V_i$, and constructing a decomposition of the graph includes constructing a graph $\overline{A}$ by independently multiplying each edge in A by a random factor in [1, t] where $t \geq 1$ is a constant. Letting $W \subset V$ be the set of nodes satisfying wd(v)>k·awd(A), for some constant k>4, wherein wd(v) is the weighted degree of node v, and awd(A) is the average weighted degree of the graph A; forming a forest graph F, by keeping the heaviest incident of v for each vertex $v \in V$ in $\overline{A}$; removing from F an edge kept by w, for every vertex $w \in W$; and decomposing each tree T in F into vertex-disjoint trees of constant conductance. Other variations and modifications are also possible with the present invention.

Construction of the Preconditioners

Let P be the decomposition computed through the previous step for the graph A, i.e. a partitioning of the vertices of the graph A into disjoint sets $V_i$ i=1, ..., m. Let $T_i$ be a tree with: (i) leaves corresponding to the vertices in $V_i$, (ii) root $r_i$, and (iii) for each $u \in V_i$, w($r_i$, u) is the total incident weight of u in A. The quotient graph Q on the set of the roots of the trees $T_i$, is defined by letting w($r_i$, $r_j$)=cap($V_i$, $V_j$). The Steiner preconditioner with respect to P, is defined as $S_P = Q + \Sigma_{i=1}^m T_i$. It should be noted that the graph Q is the Schur complement with respect to the elimination of the non-root vertices of Sp.

In a different embodiment of the method, every edge e leaving a cluster of P is subdivided into two edges of weight 2·w(e) each. This forms a new graph $A^o(V^o, E^o, w^o)$. The graph A is the Schur complement of $A^o$ with respect to the elimination of the set of added nodes. Hence the solution of the linear system Ax=b can be completely recovered from the solution of a proper linear system $A^o x' = b'$ in a way that is known to those skilled in the art. The decomposition P of A is extended into a decomposition $P^o$ of $A^o$ by assigning each newly introduced vertex to its two incident clusters in P. Note that the decomposition $P^o$ is an edge-disjoint decomposition $E^o = \cup_{i=1}^m E_i^o$ of $A^o$. Let $T_i^o$ be a tree with: (i) leaves corresponding to the vertices in $E_i^o$, (ii) root $r_i$, and (iii) for each $u \in E_i$, w($r_i$, u) is the total incident weight of a in the graph induced by the edges in $E_i^o$. The Steiner preconditioner with respect to $P^o$, is defined as $S_{P^o} = \Sigma_{i=1}^m T_i^o$. It should be noted that the quotient Q constructed with respect to P is also the Schur complement with respect to the elimination of the non-root vertices of $S_{P^o}$.

Figure 9B:
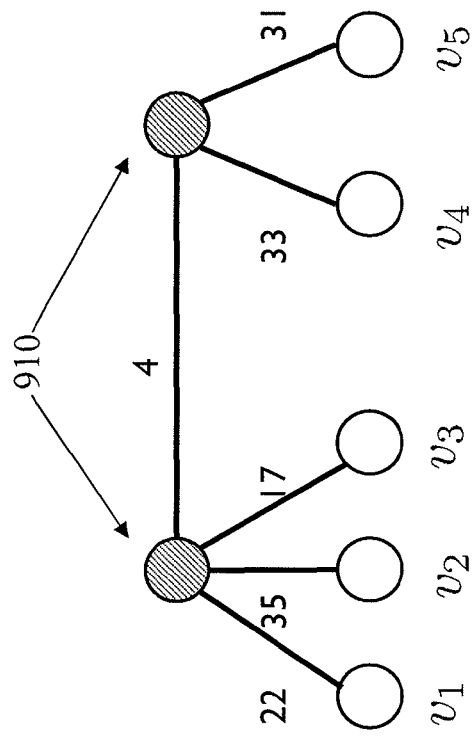
FIGS. 9a and 9b illustrate an embodiment of constructing a Steiner preconditioner according to the present invention.
Figure 9A:
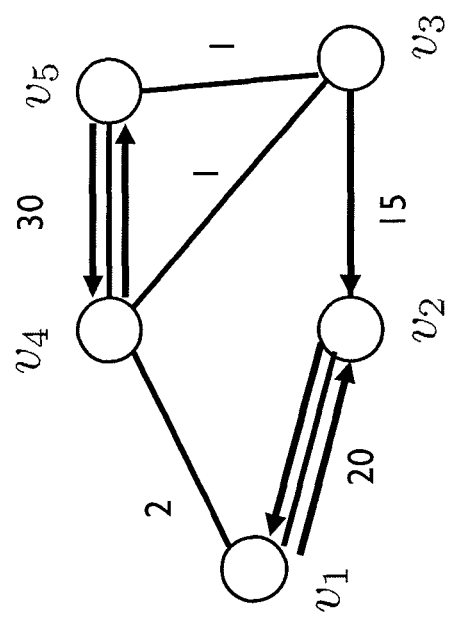

FIG. 9a and FIG. 9b illustrate one embodiment of constructing a Steiner preconditioner. In that embodiment, FIG. 9a illustrates a weighted graph having vertices ($v_1$, $v_2$, $v_3$, $v_4$, and $v_5$) and weighted edges with the weights illustrated with numbers along the edges. Each edge is connected to a forest graph through its heaviest incident (preferred) edge indicated by the arrow. FIG. 9b illustrates one example of a Steiner preconditioner having two roots 910 constructed from the graph of FIG. 9a. The preconditioner preserves sparse cuts and aggregates expanders. FIGS. 9a and 9b are only one example of constructing a Steiner preconditioner and the present invention is not limited to this example.

Construction of Two-Level Methods with Explicit Steiner Preconditioning

Following the construction of the Steiner preconditioners, we proceed with the construction of two-level processes that explicitly use the Steiner preconditioners. The methodology briefly described here has been previously disclosed in detail in [Keith Gremban. *Combinatorial Preconditioners for Sparse, Symmetric, Diagonally Dominant Linear Systems*. PhD thesis, Carnegie Mellon University, Pittsburgh, October 1996. CMU CS Tech Report CMU-CS-96-123].

Given a linear system Ax=b, one can use methods such as the Richardson iteration, the Chebyshev iteration and the Conjugate Gradient iteration, that are based solely on matrix vector products with A, to converge to the solution of the system. Their preconditioned versions work with the linear system BAx=Bb, where B is a linear operator of the same dimension with A. In general each preconditioned iteration requires the solution of a linear system of the form By=c.

The Laplacian B of the Steiner preconditioner Sp constructed through the previous step, has n+m vertices and thus it is of higher dimension than the given graph A. This doesn't allow its direct use with the graph A. This situation is rectified by augmenting A with zero rows and columns and solving the preconditioned system $$B\begin{pmatrix} A & 0 \\ 0 & 0 \end{pmatrix}\begin{pmatrix} x \\ y \end{pmatrix} = B\begin{pmatrix} b \\ 0 \end{pmatrix}.$$

In the this system, the n×n upper-left block of B contains the non-root vertices of Sp and their numbering follows the numbering of the corresponding vertices in A. The solution of the system Ax=b is obtained by keeping the x part of the [x, y]$^T$ solution of the augmented system.

The proposed augmented preconditioned system is algebraically identical to the preconditioned system B' Ax=B'b where B' is the Schur complement of Sp with respect to the elimination of the root vertices. It is known to those skilled in the art that the convergence rate of the preconditioned iterative methods is characterized by the condition number κ(A, B'). If P is [ϕ, ρ]. If P is [ϕ, ρ] decomposition, then κ(A, B')=O(1/ϕ$^2$).

Each preconditioned iteration requires the solution of a system with B. A linear system on B can be solved through the following two steps that are well understood by those skilled in the art: (i) a partial Cholesky factorization that eliminates the non-root vertices of Sp without producing fill, (ii) the solution of a linear system on the resulting Schur complement Q created through step (i). In practice, a recursive application of the two-level method may be used for the solution of Q.

The above considerations for the pair (A, Sp) apply in an analogous manner to the pair (A$^o$, S$_P^o$).

Implicit Steiner Preconditioning Through a Two-Level Multigrid Process

Following the construction of the Steiner preconditioners, we proceed to the precise description of the coarse level grid, relaxation, restriction and prolongator operators (e.g. see [Ulrich Trottenberg, Anton Schuller, and Cornelis Oosterlee. *Multigrid*. Academic Press, 1st edition, 2000.]) for two-level multigrid processes for the Laplacians A and A$^o$, through the implicit use of the Steiner preconditioners.

In the following discussion we unify the treatment of the linear systems on A and A$^o$ by using the symbols A and P interchangeably with the symbols A$^o$ and P$^o$.

Given a clustering P of the graph A, let Rp be the matrix with rows corresponding to vertices and columns corresponding to columns, with: (i) $R_P(i, j)=0$ if vertex i is not in cluster j. (ii) $R_P(i, j)=1$ if vertex i is only in cluster j, (iii) $R_P(i, j)=½$ if vertex i is only in clusters, one of which is cluster j.

| Algorithm 2: Two-level scheme |
|---|
| Input: Laplacian A = (V, E, w), vector b, approximate solution x, n × m restriction operator $R_P$ |
| Output: Updated solution x for Ax = b |
| 1. D := 0.5 * diagonal(A), Â := D$^{-1/2}$AD$^{-1/2}$, R = $R_P$ |
| 2. Q := R$^T$ AR                                              % the "coarse" grid |
| 3. z := D$^{1/2}$x |
| 4. Repeat t times z := (I − Â)z + D$^{-1/2}$b                 % relaxation |
| 5. r := D$^{-1/2}$b − Âz |
| 6. w := R$^T$D$^{1/2}$r                                       % restriction |
| 7. Update w with the solution of the linear system Qy = w |
| 8. z := z +D$^{1/2}$ Rw                                       % prolongation |
| 9. Repeat t times z := (I − Â)z + D$^{-1/2}$b                 % relaxation |
| 10. Return x := D$^{-1/2}$z |

Recursion may be used for the solution of the linear system in Q, in step 7, in ways known to those skilled in the art.

Algorithm 2 defines a positive matrix B of the same dimension with A. It is well known to those skilled in the art that the convergence rate of Algorithm 2 as a stand-alone solver, depends linearly on κ(A, B). If P is [ϕ, ρ] decomposition. then κ(A, B)=O(1/ϕ$^2$). In practice, the matrix B can be used as a regular preconditioner in the preconditioned Conjugated Gradient iteration to obtain a convergence rate that depends linearly on $\sqrt{κ(A,B)}$.

With reference to the methods described above, Algorithm 2 may be used in constructing a two-level process (step 116). In one example, constructing a two level process may include, given input graph A with n vertices and a Steiner preconditioner for A containing m rooted stars, outputting an n×m restriction operator $R_P$, and a two-level scheme wherein: $R_P(i, j)=0$ if vertex i is in the star with root j; $R_P(i, j)=1$ if vertex i is only in the star with root j; $R_P(i, j)=½$ if vertex i is in the star with root j and in one more star; and the two level scheme includes Algorithm 2.

In addition, the examples provided herein are illustrative and not limiting, and other variations and modifications of the present invention are contemplated, such as by the application of Gaussian elimination on vertices of degree higher than two and application of Gaussian elimination steps within the pieces, before the construction of the two-level method. Those and other variations and modifications of the present invention are possible and contemplated, and it is intended that the foregoing specification and the following claims cover such modifications and variations.

The invention claimed is:

1. A method for solving a system on a symmetric diagonally dominant matrix on a processor programmed to perform the following steps of:
   constructing an equivalent symmetric diagonally dominant linear system Ax=b from the system on the symmetric diagonally dominant matrix, wherein the matrix A of the equivalent linear system Ax=b has negative off-diagonal entries and zero row sums;
   constructing a graph of the matrix A of the equivalent linear system;
   constructing a decomposition of the graph;
   constructing a two-level process using the decomposition of the graph, wherein the two-level process includes reducing the equivalent linear system Ax=b to a linear system By=c; and
   extending the two-level process to a multi-level process having more than two levels.

2. The method of claim 1, wherein:
constructing an equivalent symmetric diagonally dominant linear system includes:
  providing data indicative of a digital image;
  converting the data indicative of the digital image into a graph of the image;
  constructing the Matrix A from the graph of the image; and
  wherein extending the two-level process includes:
    producing a solution to the linear system Ax=b using the multi-level process;
    producing solutions to a plurality of linear systems based on the solution to the linear system Ax=b;
    identifying a boundary in the data indicative of the digital image, wherein identifying a boundary in the data is based on the solutions to the plurality of linear systems;
    producing an output indicative of the boundary in the data indicative of the digital image.

3. The method of claim 2, wherein identifying a boundary in the data indicative of the digital image includes identifying a line boundary in data indicative of a two-dimensional image and identifying a surface boundary in data indicative of a three-dimensional image.

4. The method of claim 2, wherein producing output indicative of the boundary in the data indicative of the digital image includes producing a measure of the boundary.

5. The method of claim 4, wherein producing a measure of the boundary includes producing a measure of area of the boundary in data indicative of a two-dimensional image and producing a measure of volume of the boundary in data indicative of a three-dimensional image.

6. The method of claim 2, wherein producing output indicative of the boundary in the data indicative of the digital image includes producing a new image illustrating the boundary in the data indicative of the digital image.

7. The method of claim 1, further comprising:
  constructing Steiner preconditioners for the graph using the decomposition; and
  constructing the two-level process includes using the Steiner preconditioners for the graph.

8. The method of claim 7, wherein constructing a two-level process includes use of the Steiner preconditioner with a preconditioned iterative method.

9. The method of claim 8, wherein constructing a two-level process includes, given input graph A with n vertices and a Steiner preconditioner for A containing m rooted stars, outputting an n×m restriction operator $R_P$, and a two-level scheme wherein:
  $R_P(i,j)$=0 if vertex i is in the star with root j;
  $R_P(i,j)$=1 if vertex i is only in the star with root j;
  $R_P(i,j)$=½ if vertex i is in the star with root j and in one more star; and
  the two level scheme includes:
  Input: Laplacian A=(V, E, w), vector b, approximate solution x, n×m restriction operator $R_P$
  Output: Updated solution x for Ax=b

---

1. D := 0.5 * diagonal (A), Â := $D^{-1/2} A D^{-1/2}$, R = $R_P$
2. Q := $R^T A R$                                % the "coarse" grid
3. z := $D^{1/2} x$
4. Repeat t times z := (I − Â) z + $D^{-1/2} b$        % relaxation
5. r := $D^{1/2} x$ − Âz
6. w := $R^T D^{1/2} r$                          % restriction
7. Update w with the solution of the linear system Qy = w -continued 8. z := z + $D^{1/2} R w$                        % prolongation
9. Repeat t times z := (I − Â)z + $D^{-1/2} b$        % relaxation
10. Return x := $D^{-1/2} z$.

---

10. The method of claim 7, wherein constructing a two-level process includes use of the Steiner preconditioner through the use of a restriction operator, a prolongation operator, a smoothing operator and a second level graph.

11. The method of claim 7, wherein constructing Steiner preconditioners for the graph includes:
  constructing a rooted weighted star for each cluster in the decomposition of the graph, wherein leaves of the rooted weighted star correspond to nodes in the cluster; and
  connecting roots of the star by properly weighted edges to form the preconditioner.

12. The method of claim 1, wherein constructing a two-level process includes:
  constructing an equivalent graph and its linear system through subdividing at least one edge of the graph of the matrix A; and
  constructing at least one Steiner preconditioner for the equivalent graph using the decomposition.

13. The method of claim 12, wherein constructing the equivalent graph and constructing the Steiner preconditioners for the equivalent graph includes:
  subdividing the edges whose endpoints are in different clusters of the decomposition;
  extending original disjoint clusters to overlapping clusters through assigning each newly introduced vertex to its two incident clusters; and
  constructing a rooted weighted star for each cluster in the decomposition of the graph.

14. The method of claim 1, wherein constructing the two-level process includes constructing a sequence of two-level methods $P_1, P_2 \ldots, P_m$, wherein:
  $P_i$ is a reduction of a linear system $A_i x_i = b_i$ to a linear system $B_i y_i = c_i$;
  the linear system $A_{i+1} x_{i+1} = b_{i+1}$ is identical to the linear system $$B_{i-1} y_{i-1} = c_{i-1}; \text{ and}$$

the linear system $B_m y_m = c_m$ satisfies a predetermined maximum size requirement that can be solved using a direct solver.

15. The method of claim 1, wherein constructing the equivalent linear system includes:
  constructing a symmetric diagonally dominant linear system Bx'=b', wherein Bx'=b' is equivalent to Ax=b, and wherein B has non-positive off-diagonal entries; and
  constructing a symmetric diagonally dominant linear system Cx"=b", wherein Cx"=b" is equivalent to Bx'=b', and wherein C has non-positive off-diagonal entries and zero row sums.

16. The method of claim 15, wherein constructing the linear system Bx'=b' includes constructing the linear system $$B \begin{pmatrix} x \\ -x \end{pmatrix} = \begin{pmatrix} b \\ -b \end{pmatrix}$$

wherein:

$$B = \begin{pmatrix} D+A_n & -A_p \\ -A_p & D+A_n \end{pmatrix};$$

D is the diagonal of A;
$A_P$ is the matrix consisting of the positive off-diagonal entries of A; and
$A_n$ is the matrix consisting of the negative off-diagonal entries of A.

17. The method of claim 15, wherein constructing the linear system Cx"=b" includes constructing the linear system $$C \begin{pmatrix} x^1 \\ -x^1 \\ 0 \end{pmatrix} = \begin{pmatrix} b^1 \\ -b^1 \\ 0 \end{pmatrix}$$

wherein:

$$C = \begin{pmatrix} B & 0 & -g \\ 0 & B & -g \\ -g^T & -g^T & \sum_i g_i \end{pmatrix} \text{ and;}$$

$g_i = B_{i,i} + \Sigma_{j \neq i} B_{i,j}$.

18. The method of claim 1, wherein constructing a decomposition of the graph includes constructing a decomposition of input graph A=(V, E, w), to disjoint clusters $V_i$ with $V=\cup_i V_i$, and wherein a graph induced by vertices in each $V_i$ and edges leaving $V_i$ is a graph of constant conductance.

19. The method of claim 1, wherein an input is Graph A=(V, E, w), Output is Disjoint Clusters $V_i$ with $V=\cup_i V_i$, and wherein constructing the decomposition of the graph includes:
constructing a graph A by independently multiplying each edge in A by a random factor in [1, t] where t≧1 is a constant;
letting $W \subseteq V$ be the set of nodes satisfying wd(v)>k·awd (A), for some constant k>4, wherein wd(v) is the weighted degree of node v, and awd(A) is the average weighted degree of the graph A;
forming a forest graph F, by keeping the heaviest incident edge of v for each vertex v∈Vin $\overline{A}$;
removing from F an edge kept by w, for every vertex w∈W; and
decomposing each tree T in F into vertex-disjoint trees of constant conductance.

20. A non-transitory computer readable memory including computer-readable instructions which, when executed by a processor, causes the processor to perform steps of:
constructing an equivalent symmetric diagonally dominant linear system from the system on a symmetric diagonally dominant matrix, wherein the equivalent linear system has negative off-diagonal entries and zero row sums;
constructing a graph of the equivalent linear system;
constructing a decomposition of the graph;
constructing a two-level process using the decomposition of the graph, wherein the two-level process includes reducing the equivalent linear system Ax=b to a linear system By=c; and
extending the two-level process to a multi-level process having more than two levels.

21. The non-transitory computer readable memory of claim 20, wherein constructing a decomposition of the graph includes constructing a decomposition of input graph A=(V, E, w), to disjoint clusters $V_i$ with $V=\cup_i V_i$, and wherein a graph induced by vertices in each $V_i$ and edges leaving $V_i$ is a graph of constant conductance.

22. The non-transitory computer readable memory of claim 20, wherein an Input is Graph A=(V, E, w), Output is Disjoint Clusters $V_i$ with $V=\cup_i V_i$, and wherein constructing the decomposition of the graph includes:
constructing a graph A by independently multiplying each edge in A by a random factor in [1, t] where t≧1 is a constant;
letting $W \subseteq V$ be the set of nodes satisfying wd(v)>k·awd (A), for some constant k>4, wherein wd(v) is the weighted degree of node v, and awd(A) is the average weighted degree of the graph A;
forming a forest graph F, by keeping the heaviest incident edge of v for each vertex v∈V in $\overline{A}$;
removing from F an edge kept by w, for every vertex w∈W; and
decomposing each tree T in F into vertex-disjoint trees of constant conductance.

23. The non-transitory computer readable memory of claim 20, wherein:
constructing an equivalent symmetric diagonally dominant linear system includes:
providing data indicative of a digital image;
converting the data indicative of the digital image into a graph of the image;
constructing the matrix A from the graph of the image; and
wherein extending the two-level process includes:
producing a solution to the linear system Ax=b using the multi-level process;
producing solutions to a plurality of linear systems based on the solution to the linear system Ax=b;
identifying a boundary in the data indicative of the digital image, wherein identifying a boundary in the data is based on the solutions to the plurality of linear systems;
producing an output indicative of the boundary in the data indicative of the digital image.

24. The non-transitory computer readable memory of claim 20, wherein identifying a boundary in the data indicative of the digital image includes identifying a line boundary in data indicative of a two-dimensional image and identifying a surface boundary in data indicative of a three-dimensional image.

25. The non-transitory computer readable memory of claim 20, wherein producing output indicative of the boundary in the data indicative of the digital image includes producing a measure of the boundary.

26. The non-transitory computer readable memory of claim 25, wherein producing a measure of the boundary includes producing a measure of area of the boundary in data indicative of a two-dimensional image and producing a measure of volume of the boundary in data indicative of a three-dimensional image.

27. The non-transitory computer readable memory of claim 20, wherein producing output indicative of the boundary in the data indicative of the digital image includes producing a new image illustrating the boundary in the data indicative of the digital image.

28. An apparatus, comprising:
a processor;
an input device connected to the processor;
an output device connected to the processor; and
computer-readable memory connected to the processor, wherein the memory includes computer-readable instructions which, when executed by the processor, cause the processor to perform the steps of:
  constructing an equivalent symmetric diagonally dominant linear system from the system on a symmetric diagonally dominant matrix, wherein the equivalent linear system has negative off-diagonal entries and zero row sums;
  constructing a graph of the equivalent linear system;
  constructing a decomposition of the graph;
  constructing a two-level process using the decomposition of the graph, wherein the two-level process includes reducing the equivalent linear system $Ax=b$ to a linear system $By=c$; and
  extending the two-level process to a multi-level process having more than two levels.

29. The apparatus of claim 28, wherein constructing a decomposition of the graph includes constructing a decomposition of input graph $A=(V, E, w)$, to disjoint clusters $V_i$ with $V=\cup_i V_i$, and wherein a graph induced by vertices in each $V_i$ and edges leaving $V_i$ is a graph of constant conductance.

30. The apparatus of claim 28, wherein an Input is Graph $A=(V, E, w)$, Output is Disjoint Clusters $V_i$ with $V=\mathring{A}_i V_i$, and wherein constructing the decomposition of the graph includes:
  constructing a graph A by independently multiplying each edge in A by a random factor in $[1, t]$ where $t\geq 1$ is a constant;
  letting $W \subseteq V$ be the set of nodes satisfying $wd(v) > k \cdot awd(\overline{A})$, for some constant $k>4$, wherein $wd(v)$ is the weighted degree of node v, and $awd(\overline{A})$ is the average weighted degree of the graph $\overline{A}$;
  forming a forest graph F, by keeping the heaviest incident edge of v for each vertex $v \in V$ in $\overline{A}$;
  removing from F an edge kept by w, for every vertex $w \in W$; and
  decomposing each tree T in F into vertex-disjoint trees of constant conductance.

31. The apparatus of claim 28, wherein:
constructing an equivalent symmetric diagonally dominant linear system includes:
  providing data indicative of a digital image;
  converting the data indicative of the digital image into a graph of the image;
  constructing the Matrix A from the graph of the image; and
wherein extending the two-level process includes:
  producing a solution to the linear system $Ax=b$ using the multi-level process;
  producing solutions to a plurality of linear systems based on the solution to the linear system $Ax=b$;
  identifying a boundary in the data indicative of the digital image, wherein identifying a boundary in the data is based on the solutions to the plurality of linear systems;
  producing an output indicative of the boundary in the data indicative of the digital image.

32. The apparatus of claim 28, wherein identifying a boundary in the data indicative of the digital image includes identifying a line boundary in data indicative of a two-dimensional image and identifying a surface boundary in data indicative of a three-dimensional image.

33. The apparatus of claim 28, wherein producing output indicative of the boundary in the data indicative of the digital image includes producing a measure of the boundary.

34. The apparatus of claim 33, wherein producing a measure of the boundary includes producing a measure of area of the boundary in data indicative of a two-dimensional image and producing a measure of volume of the boundary in data indicative of a three-dimensional image.

35. The apparatus of claim 28, wherein producing output indicative of the boundary in the data indicative of the digital image includes producing a new image illustrating the boundary in the data indicative of the digital image.

* * * * *